No. 724,864. PATENTED APR. 7, 1903.
A. S. HILL.
CORN PLANTER.
APPLICATION FILED FEB. 5, 1903.
NO MODEL.
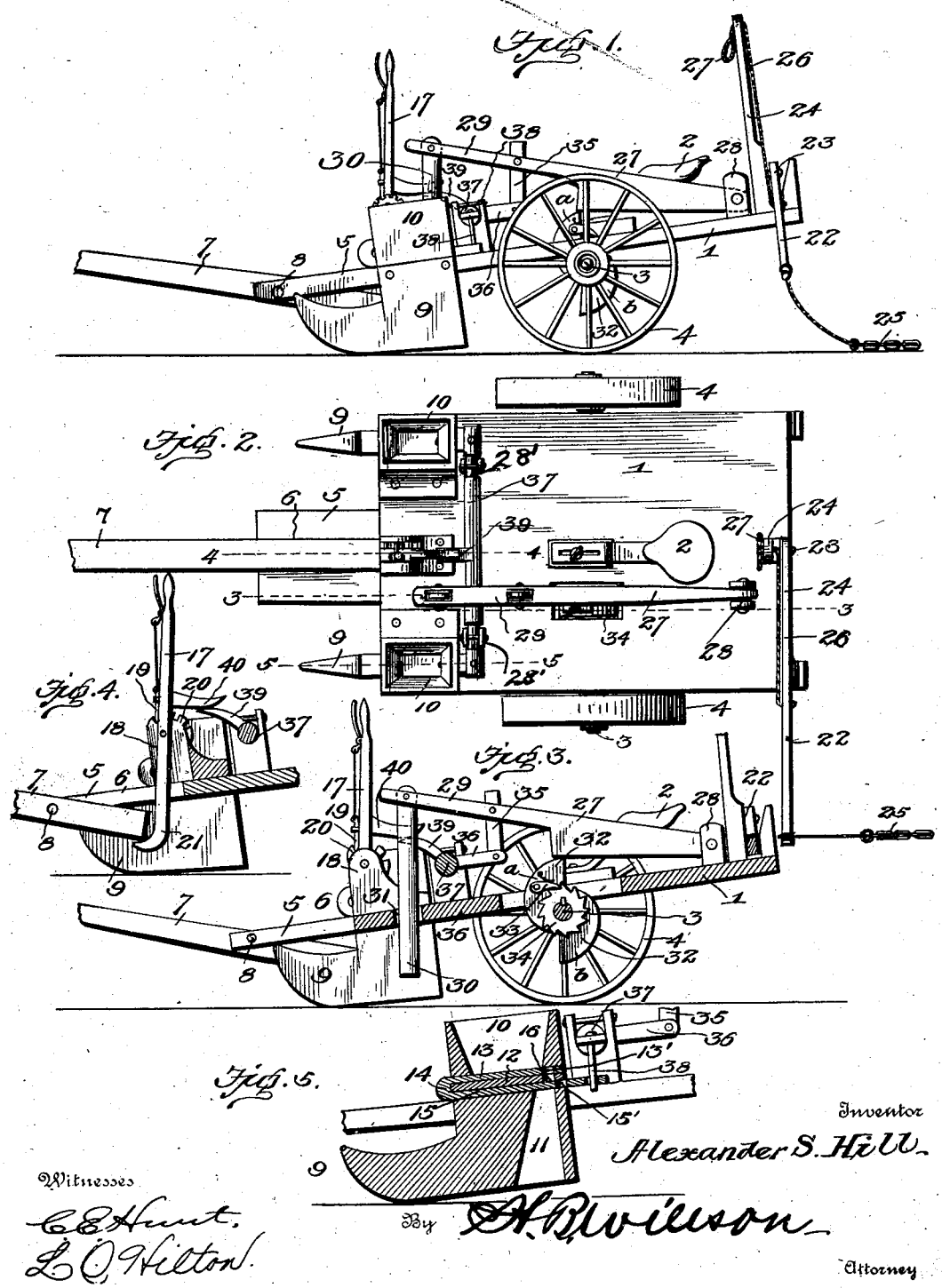
Witnesses
C. E. Hunt.
L. O. Hilton.
Inventor
Alexander S. Hill
By H. B. Wilson
Attorney

UNITED STATES PATENT OFFICE.

ALEXANDER S. HILL, OF BOVINE, SOUTH DAKOTA, ASSIGNOR OF ONE-HALF TO LEONARD UNDERWOOD, OF YANKTON, SOUTH DAKOTA.

CORN-PLANTER.

SPECIFICATION forming part of Letters Patent No. 724,864, dated April 7, 1903.

Application filed February 5, 1903. Serial No. 142,024. (No model.)

*To all whom it may concern:*

Be it known that I, ALEXANDER S. HILL, a citizen of the United States, residing at Bovine, in the county of Lyman and State of South Dakota, have invented certain new and useful Improvements in Corn-Planters; and I do declare the following to be a full, clear, and exact description of the invention, such as will enable others skilled in the art to which it appertains to make and use the same.

This invention relates to certain new and useful improvements in corn-planters.

The objects of the invention are, first, to provide an improved construction of dropping mechanism automatically operated by the movement of the planter to drop the corn at regular intervals, such mechanism being simple of construction and adapted to take the place of the cumbersome and unhandy check-row droppers commonly employed; second, to provide actuating mechanism which may be quickly and conveniently adjusted or set to properly time or regulate the dropping of the seed; third, to provide a simple and efficient form of dropping-valve; fourth, to provide marking mechanism operating synchronously with the dropping mechanism and forming part thereof, and, finally, to provide mechanism for simultaneously elevating and lowering the shoes and stopping and starting the operation of the marking and dropping devices.

With these and other objects in view the invention consists in certain novel features of construction, combination, and arrangement of parts, which will be hereinafter more fully described, and particularly defined in the appended claims.

In the accompanying drawings, Figure 1 is a side elevational view of a corn-planter embodying my invention. Fig. 2 is a top plan view of the same. Fig. 3 is a vertical longitudinal section on line 3 3 of Fig. 2. Fig. 4 is a fragmentary section on line 4 4 of Fig. 2, and Fig. 5 is a vertical section through one of the shoes and hoppers on line 5 5 of Fig. 2.

Referring now more particularly to the drawings, the numeral 1 represents a platform-frame supporting a driver's seat 2 and to which is fixed an axle 3, carrying the supporting-wheels 4. At the front the platform has an extension 5, provided with a slot 6, adapted to receive the rear end of the draft-tongue 7, which is pivoted to said extension by the pivot pin or bolt 8. Ordinary shoes or runners 9 are fixed to the front of the frame at the sides thereof and are arranged below seed-hoppers 10, and each of said shoes or runners is provided with a chute 11, through which the corn dropped from the hoppers is conducted to the furrow. The inner side walls of each hopper converge toward the bottom thereof, and the rear side wall is thus caused to partially overhang the chute 11. Between the hopper and shoe and spaced apart from each is a fixed partition 12, between which and the hopper slides a valve 13, to one end of which, as shown at 14, is connected or formed integral a similar valve 15, which slides between the partition and chute. The connecting portion 14 adapts the two valve members to slide in unison and serves also as a stop to abut against the partition 12 and limit the rearward or closing movement of the double valve. At a point beneath the rear wall of the chute the partition 12 is formed with an outlet 16, and in the valve members 13 15 are formed coacting seed-discharge openings 13' and 15', the said openings being so arranged as to lie, respectively, above and in rear of the outlet 16 when the valve is closed, as shown in Fig. 5. When the valve is moved forward, the opening 13' of the valve member 13 clears the overhanging rear wall of the hopper and forms, with the partition 12, a pocket to receive a charge of corn or seed. In such movement the opening 15' of the valve member 15 is brought into register with the discharge-outlet 16 and any seed contained within such outlet is thus allowed to discharge into the chute 11 and pass thence to the ground. Upon the rearward movement of the valve the opening 15' is moved past the outlet 16, and the latter is closed by the valve member 15, while the opening 13' is moved into register with said outlet and the latter receives a charge of seed therefrom, which is sustained by the valve member 15 until the forward movement of the valve again brings the openings 15' into register with the outlet 16, when the seed discharges into the chute 11 in the manner previously described. The mechanism which operates the valves will be fully described hereinafter.

The shoes or runners 9 support the platform-frame 1 in an inclined position, with the forward end thereof tilted downward, so that by tilting the said forward end of the platform up, so that said platform will lie horizontally, the runners will be lifted above the surface of the ground, so as to enable the planter to be conveniently transported and to turn curves at the end of rows without resistance in order to effect the adjustment of the platform and to raise and lower the runners at will. An operating-lever 17 is provided and is pivotally mounted at the front of the platform upon a bearing-bracket 18. This lever carries a pawl 19, adapted to engage a rack 20 on said bracket to hold it fixed in adjusted position and is provided with a hook-shaped lower end 21, adapted to take under the rear end of the tongue 8. When the pawl 19 is released, the handle end of the lever may be swung rearwardly, and by this movement the hooked end 21 will be thrown upwardly, thereby shifting the rear inclined end of the tongue to a horizontal position and simultaneously throwing the front end of the platform 1 upwardly, thus bringing said platform to a horizontal position and elevating the runners 9 above the surface of the ground, the parts being held in such position by locking the lever by means of its pawl to the rack 20. At the rear end of the platform a swinging bar 22 is arranged and is pivotally mounted at its inner end, as shown at 23, upon a vertical post or standard 24, so as to be swung to project beyond either side of the platform. At its outer or free end this bar carries a chain 25, which is adapted to drag along the surface of the ground and to serve as a marker for spacing the distance between rows. A rope or analogous flexible connection 26 is secured at one end to the bar 22 and passes through a guide in the post and is provided at its opposite end with a hand-loop 27, by means of which the operator from his position on the seat 2 may swing the bar to project from either side of the frame, as desired.

A vertically-vibrating lever 27 is pivoted at its rear end to a bracket 28' and is provided at its forward end with a reduced forwardly-projecting arm 29, to which is jointed a vertically-reciprocating marker bar or rod 30, which moves in a slot 31 in the platform 1 on a line between the two hoppers 10, and the purpose of which is to mark the point of deposit of the corn or seed. The lever 27 is vertically vibrated by means of a double cam or eccentric 32, fixed to the rotating shaft or axle 3, the wings or operating portions $a$ and $b$ of which cam are adapted to successively elevate the lever 27 to raise the marker 30 twice on each revolution of said shaft, the lever being adapted to drop by gravity as each operating portion of the cam clears the same under the action of the marker, which serves as a gravity-weight to perform this function, and in such movement also comes in contact with the ground and makes a mark indicating the point of deposit of the seed. The double cam or eccentric 32 is loosely mounted on the shaft or axle 3, so that it may be adjusted thereon to set the wings $a$ and $b$ at any desired point in the path of revolution to start the operation of the marker and the seed-dropping valves at any desired period following the forward movement of the planter, thus enabling the operator to readily set the seed-dropping mechanism to deposit the seed in any row in line with the points of deposit in other rows or between the points to accommodate an irregular row, as desired. A spring-actuated pawl 33, carried by the cam, is adapted to engage a ratchet-wheel 34, fixed to the shaft or axle 3, by means of which the cam may be locked against movement in adjusted position.

The arm 29 of the vibrating lever 27 is connected by a link 35 to a crank-arm 36 on a rock-shaft 37, journaled transversely of the frame in bearing-brackets 28' between the lever and the hoppers 10. This shaft 37 is also provided with arms 38, which fit in openings in rearward extensions of the valve members 15, so that upon the rocking of said shaft reciprocatory movement will be imparted to the seed-dropping valves. The rock-shaft is further provided with a cam-arm 39, adapted to be engaged by a similar arm 40 on the lever 17, by means of which when said lever is thrown rearwardly to swing the platform 1 to a horizontal position and lift the runners 9 out of the ground the shaft 37 will also be tilted to transfer movement to the links 35 to elevate the marker 30 and move the vibrating lever 27 to a height at which it will not be operated upon by the cam 32, whereby at the time the shoes 9 are elevated the seed-dropping and marking mechanism may also be thrown out of operation.

In the operation of the invention it will be readily understood that upon a forward movement of the planter motion will be imparted to the vibrating lever 27 by the cam 32, the wings $a$ and $b$ of which will alternately elevate said lever and permit it to fall under the weight or gravital action of the bar or rod 30. On each upward movement of the lever each seed-dropping valve will be moved rearwardly by the arm 38, and if any seed is contained in the opening 16 in the partition 12 it will be confined therein by the movement of the opening 15' in rear thereof. The continued movement of the device, assuming that the lever 27 has been lifted, as shown in Fig. 3, by the cam member $a$ will, however, at a certain point in the path of revolution of the axle 3 cause said member $a$ to move forwardly and to clear or release the lever 27, which will drop down under the weight of the bar 30 and actuate the rock-shaft in a reverse direction, by means of which forward motion will be imparted to the said dropping-valve, causing the opening 13' to be moved so as to receive a fresh charge of seed and the opening 15' to be moved beneath the outlet 16 to permit of the discharge of the charge of seed previously supplied to said opening 16, from which the operation will be readily understood and from which it will be seen that seed will be dropped and planted at regular and determined intervals and the point of deposit simultaneously marked by the marker 30 as long as the seed-dropping and marking devices are kept in operation and the planter in motion.

From the foregoing description, taken in connection with the accompanying drawings, the construction, mode of operation, and advantages of my invention will be readily understood, and it will be seen that a simple, reliable, and efficient form of mechanism is provided whereby the use of the ordinary cumbersome and unhandy check-rower may be dispensed with and the seed deposited by the direct action of mechanism in gear with a movable part of the planter.

Various changes in the form, proportion, and the minor details of construction may be resorted to without departing from the principle or sacrificing any of the advantages of the invention.

Having thus described my invention, what I claim as new, and desire to protect by Letters Patent, is—

1. In a corn-planter, the combination with a driving-axle, of seed-dropping mechanism, the same including a rock-shaft and a vertically-vibrating lever in operative connection therewith, and a member on the axle for periodically operating the said lever, said member being adapted for setting the dropping mechanism to operate at a desired period in the path of revolution of the axle.

2. In a corn-planter and in combination with a driving-axle, seed-dropping mechanism including a vertically-vibrating lever, a rock-shaft actuated by said lever, of a cam on the axle for periodically vibrating said lever, said cam being axially adjustable, means for dropping the lever by gravity to actuate the rock-shaft when the cam passes out of contact with the lever, and means for holding the lever elevated so as not to be operated by the cam, substantially as described.

3. In a corn-planter, a hopper having a partition provided with a seed-outlet, a double slide-valve comprising members disposed above and below the partition and having feed-openings at different points controlling the feed of seed to and discharge of seed from said outlet, a rock-shaft for sliding said valve, a vibrating lever for operating the shaft, and a cam for vibrating said lever, substantially as described.

4. In a corn-planter and in combination with a driving-axle, a vibrating lever, a cam on the axle for periodically elevating said lever, and a marking device acting as a gravity-weight for dropping the lever when released by the cam, substantially as described.

5. In a corn-planter and in combination with a driving-axle, a vibrating lever, a cam on the axle for periodically elevating said lever, said cam being axially adjustable, means for locking the cam in adjusted position, and a marking device acting as a gravity-weight for dropping the lever when released by the cam, substantially as described.

6. In a corn-planter, the combination with a driving-axle, of seed-dropping mechanism including a dropping-valve, a vertically-vibrating gravity dropping-lever, a cam on the axle for vibrating said lever, and a rock-shaft actuated by the lever and adapted to operate the valve, substantially as described.

7. In a corn-planter, the combination with a driving-axle, of seed-dropping mechanism including a dropping-valve, a vibrating lever, a cam on the axle for elevating said lever and periodically releasing it, a marking device acting as a gravity-weight for dropping the lever when released, and a rock-shaft actuated by the lever and adapted to operate the valve, substantially as described.

8. In a corn-planter, the combination of a tiltable frame, a drive-axle provided with wheels, runners at the forward end of the frame, a pivoted tongue, a vibrating lever, a cam on the axle for elevating said lever, a marker forming a gravity-weight to cause the lever to fall when the cam clears the same, hoppers provided with dropping-valves, a rock-shaft actuated by the lever and adapted to operate the valves, a lever pivoted to the frame and engaging the tongue for locking the forward end of the tongue and elevating the forward end of the frame and runners, and means coacting with the lever for throwing the vibrating lever out of operation, substantially as described.

In testimony whereof I have hereunto set my hand in presence of two subscribing witnesses.

ALEXANDER S. HILL.

Witnesses:
C. H. GRIESBAUER,
C. C. HINES.